United States Patent [19]

Takaba

[11] Patent Number: 4,918,347
[45] Date of Patent: Apr. 17, 1990

[54] COIL WINDING CONSTRUCTION FOR AN ELECTRIC MOTOR

[75] Inventor: Yosuke Takaba, Iida, Japan

[73] Assignee: Tamagawa Seiki Kabushiki Kaisha, Tokyo, Japan

[21] Appl. No.: 248,424

[22] Filed: Sep. 23, 1988

[30] Foreign Application Priority Data

Jul. 21, 1988 [JP] Japan .................. 63-95675[U]

[51] Int. Cl.⁴ .................. H02K 3/00; H02K 1/00
[52] U.S. Cl. .................. 310/179; 310/180; 310/184
[58] Field of Search .............. 310/179, 180, 184, 185, 310/198, 203, 208, 254

[56] References Cited

U.S. PATENT DOCUMENTS 3,324,322  6/1964  Johns ........................... 310/198
3,439,205  3/1966  Houtman ...................... 310/180
3,633,056  1/1972  Hoffmeyer .................... 310/185
4,780,634  10/1988  Masterman .................. 310/179
4,806,812  2/1989  Masterman .................. 310/184

FOREIGN PATENT DOCUMENTS 55-63560  5/1980  Japan ......................... 310/179
7945  1/1988  Japan .

Primary Examiner—Patrick R. Salce
Attorney, Agent, or Firm—Brooks Haidt Haffner. & Delahunty

[57] ABSTRACT

This invention relates to a coil construction for an electric motor comprising a stator having a plurality of slots and teeth, a plurality of windings Uc, Vc and Wc of the respective phases are arranged as a plurality of coil series $C_1$ and $C_2$, said coil series $C_1$ and $C_2$ are wound independently each other, whereby it is able to procure a high redundancy of said coil series $C_1$ and $C_2$.

3 Claims, 5 Drawing Sheets

U PHASE COIL   Uc = U1 + U2 + U3
V PHASE COIL   Vc = V1 + V2 + V3
W PHASE COIL   Wc = W1 + W2 + W3

COIL WINDING CONSTRUCTION FOR AN ELECTRIC MOTOR

BACKGROUND OF THE INVENTION

1. Field of the Invention

This invention relates to a coil winding construction for an electric motor. More particularly, it relates to a novel improvement therein in which the safety or redundancy of each of the polyphase windings is procured by using multiple coil systems or series and in which the coils of the different series are rendered to be independent of one another to strengthen the insulation as well as to procure high fidelity in redundancy.

2. Prior Art

A number of different winding structures of the above type for the electric motors have been proposed in the art. As typical of these constructions, first and second prior-art examples disclosed in our copending Japanese Utility Model Laid Open Publication No. 7945/1988, will be described briefly by referring to FIGS. 1 to 4.

In the first prior-art example shown in FIGS. 1 and 2, the winding Uc of the U-phase is formed by a triple coil structure including three coils $U_1$, $U_2$ and $U_3$, the winding Vc of the V-phase is formed by a triple coil structure including three coils $V_1$, $V_2$ and $V_3$ and the winding Wc of the W-phase is formed by a triple coil structure including three coils $W_1$, $W_2$ and $W_3$. There are eighteen slots ① to ⑱ of the stator 1 and the respective slot numbers ① to ⑱ are indicated in FIGS. 1 and 2 as being enclosed in circle marks.

Between the slots ① to ⑱, eighteen stator teeth 2 are formed. A rotor 5 formed integrally with the rotor shaft 4 is mounted for rotation within a rotor accommodating opening 3 provided centrally of the stator 1.

As shown in FIG. 2, six magnetized regions are formed on the rotor 5 as magnetic poles for constituting a three-phase six-pole motor.

As shown in the winding diagram of FIG. 2, coil $U_1$, $U_2$ and $U_3$ of the U-phase winding Uc are wound as a bundle in a slot ① by way of a same starting slot of the winding procedure. The coils $V_1$, $V_2$ and $V_3$ of the V-phase winding Vc are wound as a bundle in a slot ③ by way of a same starting slot of the winding procedure, while the coils $W_1$, $W_2$ and $W_3$ of the W-phase winding Wc are wound as a bundle in a slot ⑤ by way of a same starting slot of the winding procedure.

The aforementioned phase winding Uc, Vc and Wc are initially wound at the slots ①, ③ and ⑤ and then wound in the slots ① to ⑱ in the manner shown in FIGS. 1 and 2 to constitute the three-phase drive windings.

The above described electric motor according to the first prior-art example operates as follows:

In the state of FIG. 1, three-phase drive signals are sequentially applied to the U-phase coil Uc, V-phase coil Vc and the W-phase coil Wc, by electric switching means, not shown. Hence the rotor is driven into continuous revolutions under the magnetic interaction between the stator teeth 2 and magnetic poles of the rotor 5.

The second prior-art example shown in FIGS. 3 and 4 are proposed for improving the above described deficiencies of the first prior-art. In the following description, the parts or components same as or equivalent to those of the preceding embodiment are indicated by the same numerals of said prior-art in FIGS. 3 and 4.

A coil winding construction for an electric motor according to the second prior-art is shown in FIGS. 3 and 4, wherein the numeral 1 denotes a stator 1 formed with a number of slots ① to ⑱ at a predetermined angular interval from one another.

Between these slots ① to ⑱, eighteen stator teeth 2 are formed. A rotor 5 formed integrally with the rotor shaft 4 is accommodated for rotation within a rotor accommodating opening 3 provided at the center of the stator 1.

Six magnetized regions 5a to 5f are formed on the rotor 5 to form six magnetic poles to constitute a three-phase six-pole brushless d.c. motor.

Three-phas windings Uc, Vc and Wc are wound in the slots ① to ⑱ of the stator 1. The U-phase windings Uc are formed as a triple coil structure formed by coils $U_1$, $U_2$ and $U_3$, the V-phase windings Vc are formed as a triple coil structure formed by coils $V_1$, $V_2$ and $V_3$ and the W-phase windings Wc are formed as a triple coil structure formed by coils $W_1$, $W_2$ and $W_3$.

Referring to the coil winding connection diagram of FIG. 4, the coils $U_1$, $U_2$ and $U_3$ of the U-phase windings Uc are initially wound at the slots ①, ⑦ and ⑬ respectively by way of starting slot of the winding procedure and the ultimately wound at the slots ⑩, ⑯ and ④ respectively by way of terminate the winding procedure.

The coils $V_1$, $V_2$ and $V_3$ of the V-phase windings Vc are initially wound at the slots ⑤, ⑪ and ⑰ respectively by way of a different starting slot of the winding procedure and are ultimately wouynd at the slots 12, 18 and 6 respectively by way of terminating the winding procedure.

The coils $W_1$, $W_2$ and $W_3$ of the W-phase windings Wc are initially wound at the slots ⑤, ⑪ and ⑰ respectively by way of a different starting slot of the winding procedure and are ultimately wound at the slots ⑭, ② and ⑧ respectively by way of terminating the winding procedure.

It will be seen from above that the coils $U_1$ to $U_3$, $V_1$ to $V_3$ and $W_1$ to $W_3$ of the three triple coil series of the phase windings Uc, Vc and Wc are not wound in such a manner that the three coils are accommodated simultaneously in common slots, as in the prior-art first example, but the coils are initially accommodated within different slots by way of starting the winding procedure, and that the coils in the slots ① to ⑱ may be insulated easily and reliably.

In accordance with the construction shown in FIGS. 3 and 4, the winding state of the coils $U_1$ to $U_3$, $V_1$ to $V_3$ and $W_1$ to $W_3$ of the single, double and triple systems in the three phases U, V and W is schematically shown.

In the above construction, three phase driven signals are sequentially applied to the U-phase coil Uc, V-phase coil Vc and to the W-phase coil Wc, by means of electronic switching means, not shown, such that the rotor 5 is driven into continuous revolutions under magnetic interactions between the stator teeth 2 and the magnetic poles 5a to 5f of the rotor 5.

In the first prior-art example shown in FIGS. 1 and 2, the coils $U_1$, $U_2$, $U_3$, $V_1$, $V_2$, $V_3$ and $W_1$, $W_2$, $W_3$ of the phase windings Uc, Vc and Wc, wound triply for assuring the safe operation, are initially wound in the slots ①, ③ and ⑤ as bundles, such that the three coils are insulated as one unit in the independent state, using slot insulations and coil end insulations. Therefore, when the insulating properties of the insulators are deteriorated under thermal effects, for example, the three coils arranged as a triple coil structure may be shorted simultaneously to lower or imperil the operating reliability.

In the second prior-art example shown in FIGS. 3 and 4, an improvement is achieved in assuring insulating properties as compared with the construction of the above described first prior-art example. However, as shown in FIGS. 3 and 4, the windings are not independent for each of the coil series and are partially overlapped with one another in the course of winding. The result is that the insulation between the windings is not complete and, in case the insulating properties are lost, redundancy can be assured only with considerable difficulties.

SUMMARY OF THE INVENTION

It is therefore a principal object of the present invention to provide a coil winding construction for an electric motor wherein a multiple coil system or series is used for the polyphase windings to assure safety or redundancy of the windings and wherein the systems are independent of one another to intensify the insulation as well as to assure high reliability in redundancy.

In accordance with the present invention, there is provided a coil winding construction for an electric motor comprising a stator having a number of slots and teeth, a rotor mounted for rotation within a rotor accommodating opening provided centrally of the stator and windings of the three phases provided within the slots, where the improvement resides in that the windings of the three phases are arranged at least a double coil structure including a first series and a second series, in that the windings of the three phases are wound over a plurality of slots for each of ther series and in that the windings of said series are wound independently for each of the two or three coils series.

According to the coil windings construction for an electric motor of the present invention, the windings of each of the three phases are formed by coils of multiple coil series (for example, a double or triple coil structure) and are accommodated in a plurality of slots in each of the coil series. The windings of each of the coil series are formed independently for each of the series and are not accommodated in the remaining series so that insulation properties between the adjoining series are fully achieved. Even if the coils of multi-phases of a single series are ruptured or insulated insufficiently, the coils of the remaining coil series are not ruptured or deteriorated in insulating properties. Hence the durability and operational, reliability are significantly improved when the electric motor having a coil winding construction of the present invention is utilized in aircraft or space equipment.

BRIEF DESCRIPTION OF THE DRAWINGS

FIGS. 5 and 6 illustrate a coil winding construction for the electric motor according to the present invention, wherein FIG. 5 shows the wiring connection for coils in FIG. 5.

DESCRIPTION OF PREFERRED EMBODIMENT

Figure 1:
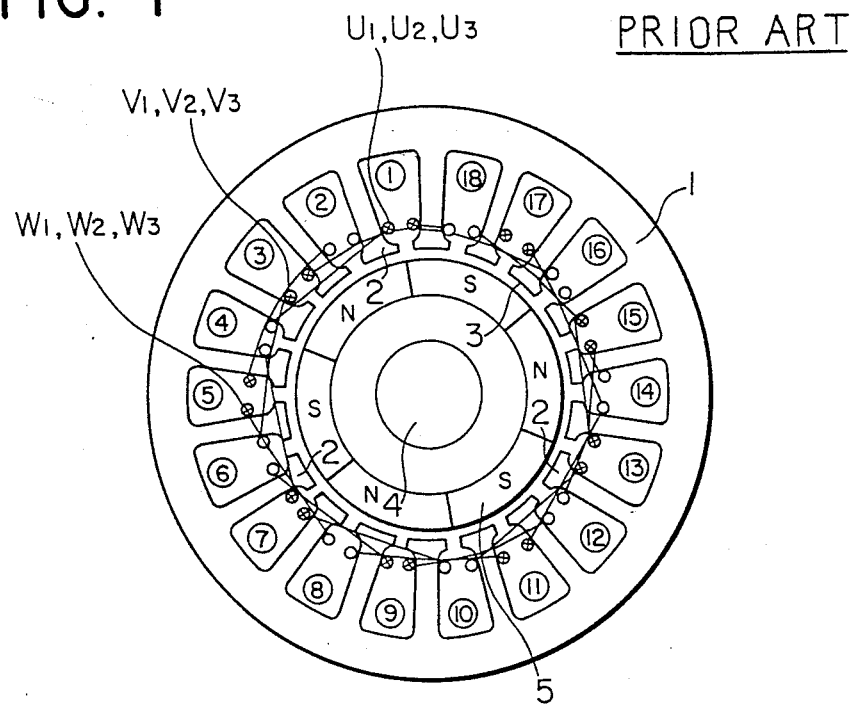
FIGS. 1 and 2 are views showing the overall arrangement and the wiring connection of the coils of a first prior-art example.

A preferred embodiment of a coil winding construction for an electric motor of the present invention will be hereafter explained by referring to the accompanying drawings.

The same or equivalent parts to those of the prior-art device are depicted by the same reference numerals.

Figure 6:
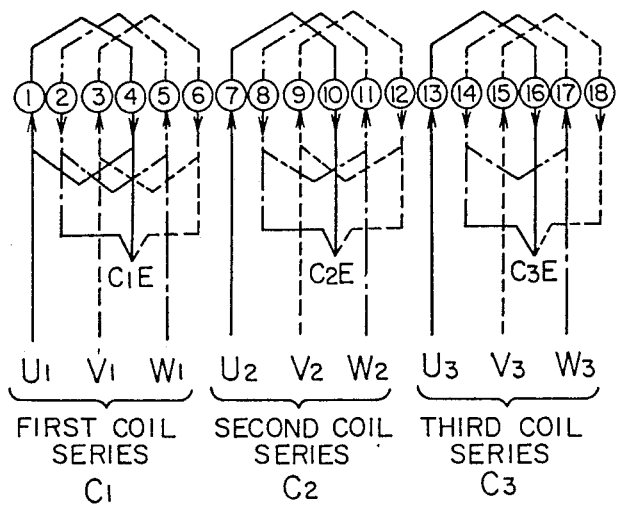
Figure 2:
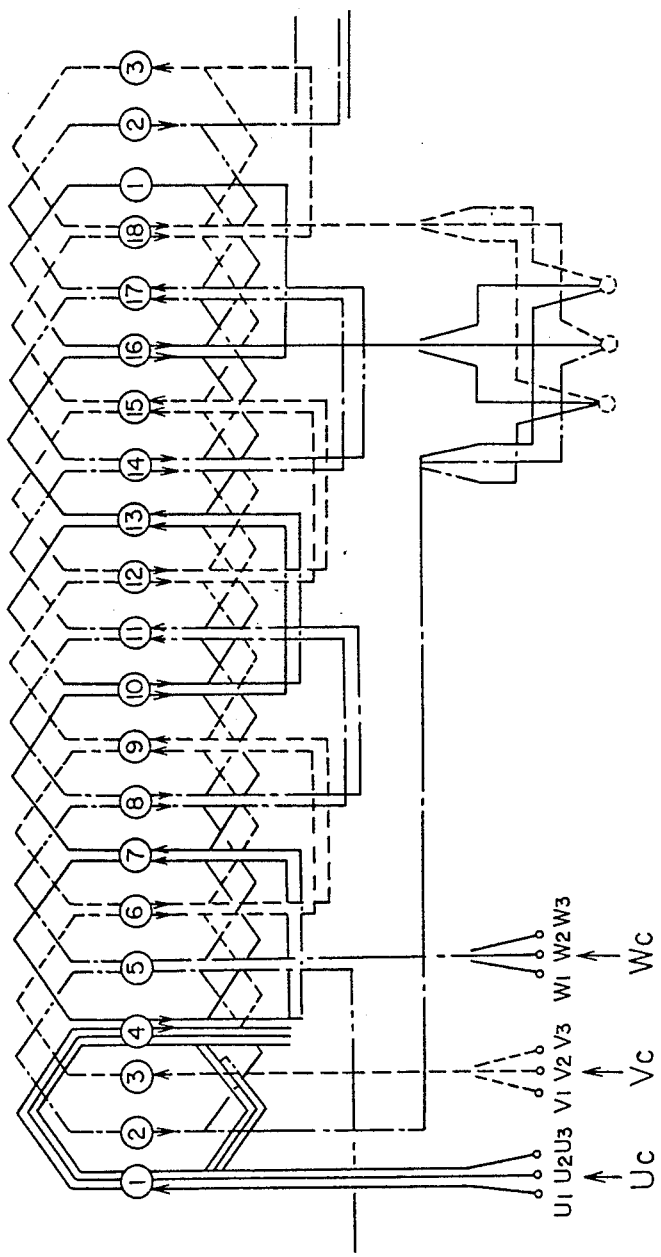
Figure 3:
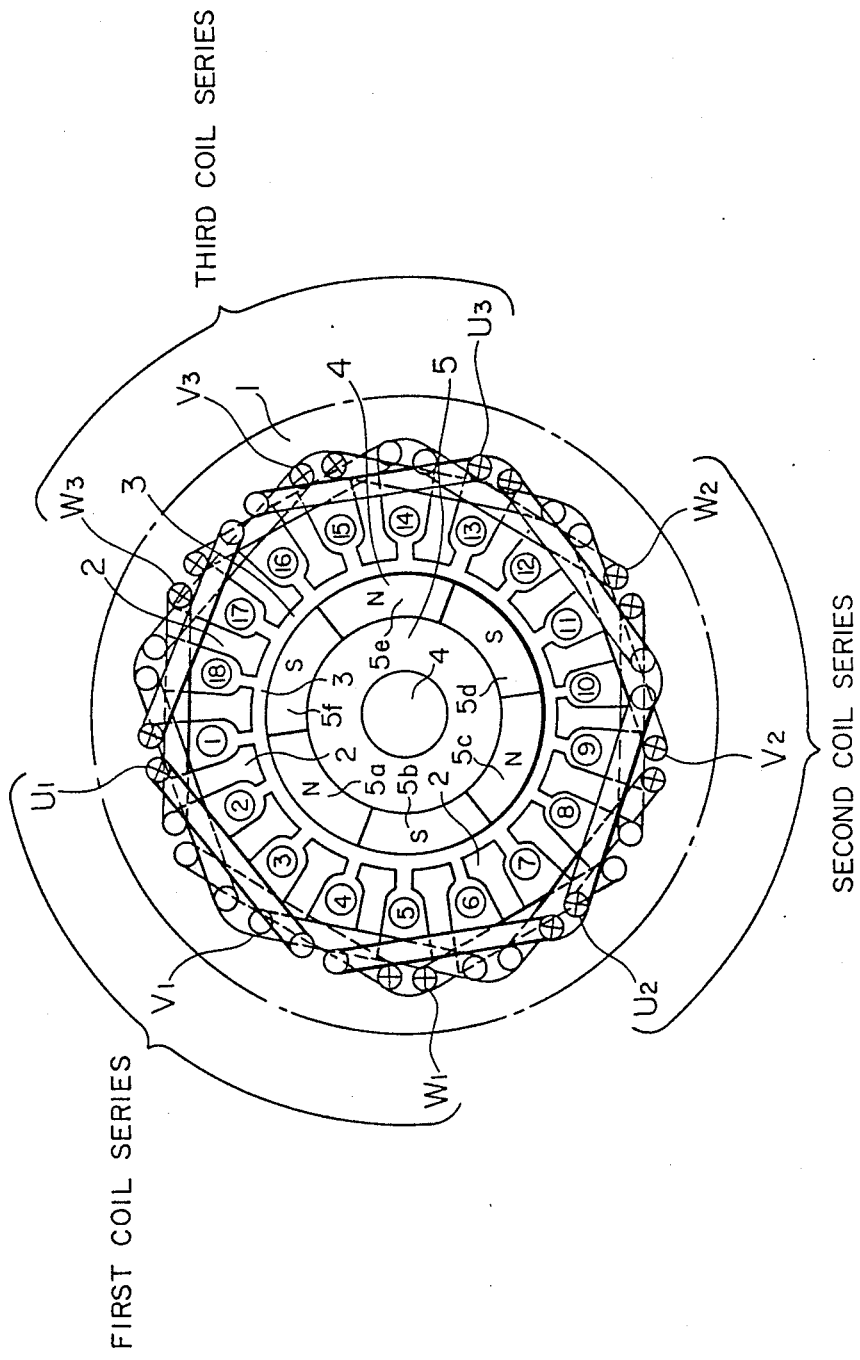
FIGS. 3 and 4 are views showing the overall arrangement and the wiring connection of the coils of a second prior-art example.
Figure 4:
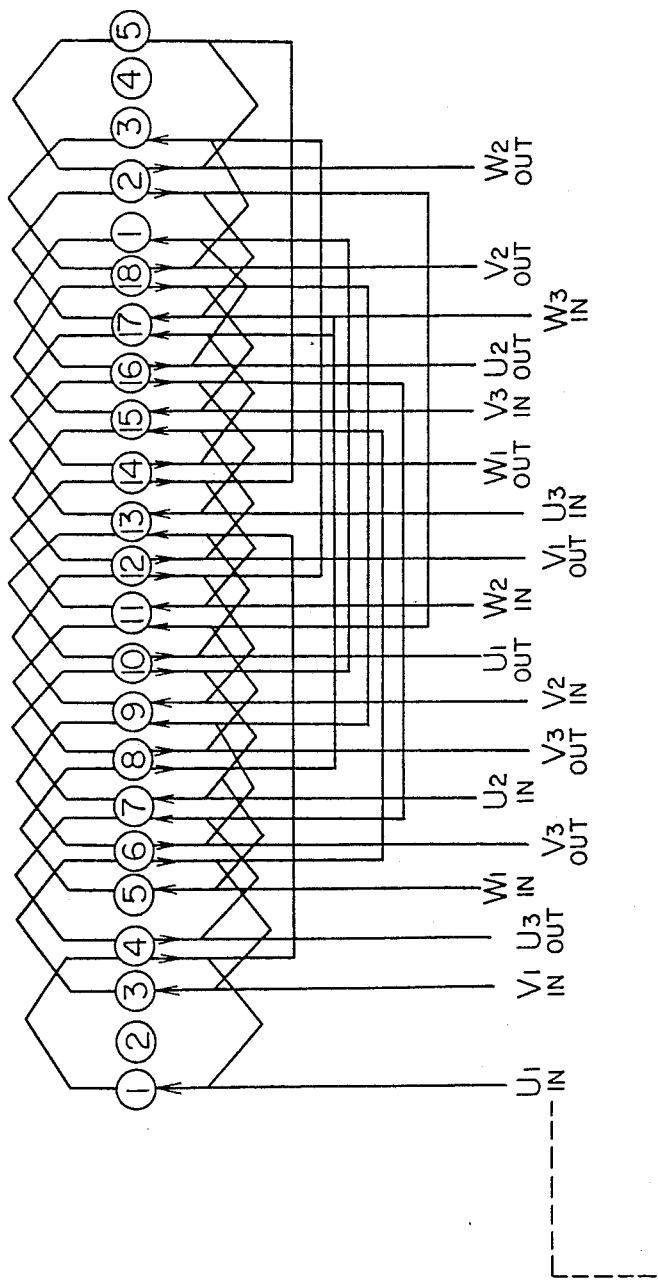
Figure 5:
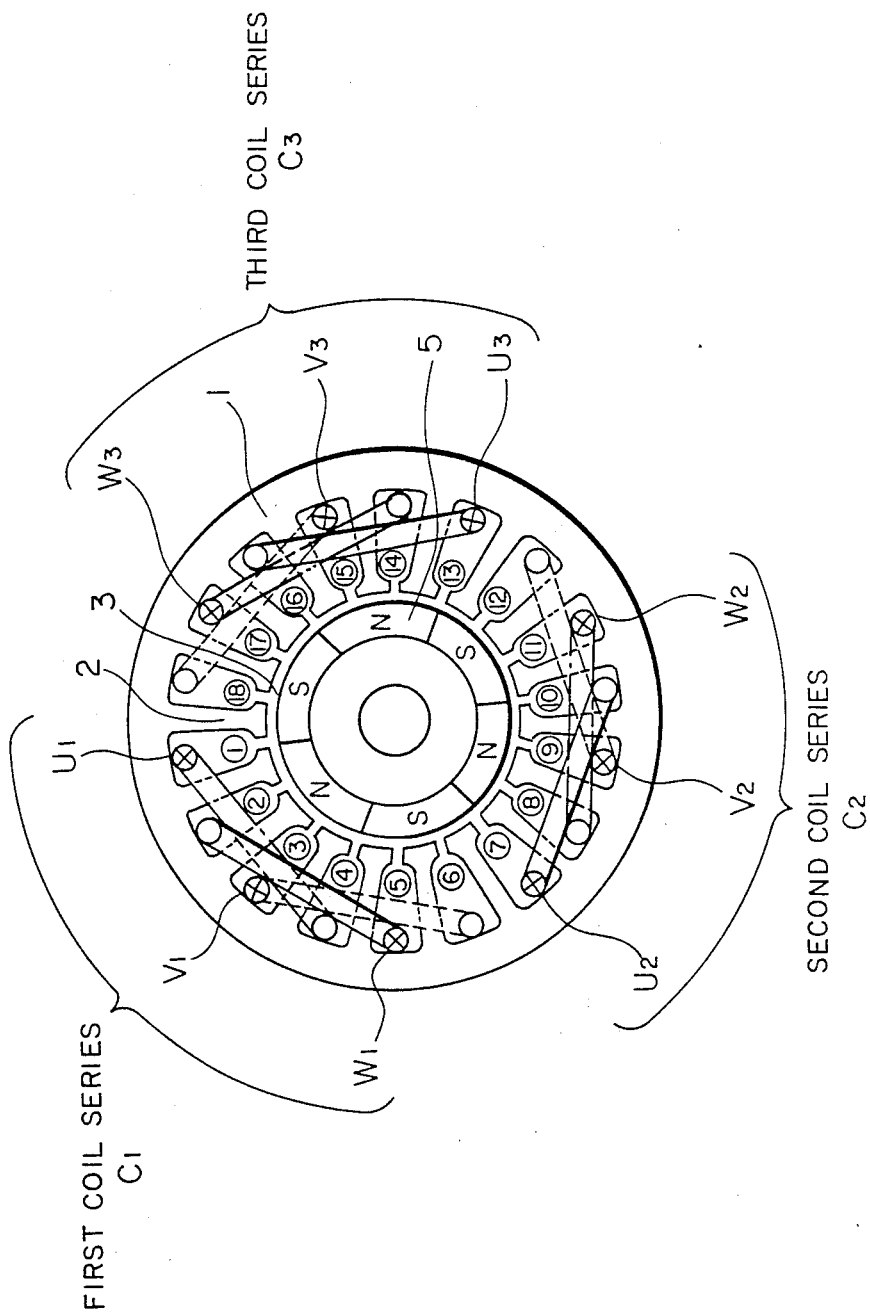

FIGS. 5 and 6 show a coil winding construction for the electric motor of the present invention, wherein the numeral 1 denotes a stator formed with a large number of equiangular slots ① to ⑱.

Between these slots ① to ⑱, eighteen stator teeth 2 are formed. The stator 1 has a central rotor accommodating opening 3 within which a rotor 5 formed integrally with a rotor shaft 4 is rotatably accommodated.

The rotor 5 is formed with six poles or magnetized regions 5a to 5f so that a three-phase six-pole electric motor is constituted.

In the slots ① to ⑱ of the stator 1, three-phase windings Uc, Vc and Wc are wound. The U-phase winding Uc is comprised of a triple coil structure composed of coils $U_1$, $U_2$ and $U_3$, the V-phase winding Vc is comprised of a triple coil structure composed of coils $V_1$, $V_2$ and $V_3$ and the W-phase winding Wc is comprised of a triple coil structure of coils $W_1$, $W_2$ and $W_3$.

As shown in the coil winding wiring of FIG. 6 for the U-phase winding Uc, V-phase winding Vc and W-phase winding Wc, the coils $U_1$, $V_1$ and $W_1$ of the first coil series $C_1$ are wound from slot ① via slot ④ to a coil end $C_1E$, from slot ③ via slot ⑥ to the coil end $C_1E$ and from slot ⑤ via slot ② to the coil end $C_1E$ respectively.

The coils $U_2$, $V_2$ and $W_2$ of the second coil series $C_2$ are wound from slot ⑦ via slot ⑩ to a coil end $C_2E$, from slot ⑨ via slot ⑫ to the coil end $C_2E$ and from slot ⑪ via slot ⑧ to the coil end $C_2E$ respectively.

The coils $U_3$, $V_3$ and $W_3$ of the third coil series $C_3$ are wound from slot ⑬ via slot ⑯ to a coil end $C_3E$, from slot ⑮ via slot ⑱ to the coil end $C_3E$ and from slot ⑰ via slot ⑭ to the coil end $C_3E$ respectively.

In the manner, as will become apparent from the foregoing description, the coils $U_1$ to $U_3$, $V_1$ to $V_3$ and $W_1$ to $W_3$ of the respective coil series $C_1$ to $C_3$ of the phase windings Uc, Vc and Wc are wound separately for each of the series $C_1$ to $C_3$ and without overlapping with each other as shown in FIG. 5. There is no coil straddling the slots ① and ⑱, slots ⑥ and ⑦ and slots ⑫ and ⑬ so that the windings in the series C1 to C3 of the triple coil structure are provided as separate blocks.

In the state of FIG. 5, three-phase drive signals are sequentially applied to the U-phase coil Uc, V-phase coil Vc and W-phase coil Wc, by electronic switching means, not shown. Hence the rotor is driven into continuous revolutions under the magnetic interactions between the stator teeth 2 and the respective magnetic poles 5a to 5f of the rotor 5.

In the above embodiment, the coil winding construction for the 3-phase 6-pole motor having triple series of windings has been explained. However, the motor may be designed with a dual or quadruple coil series or with two or four phases availably.

What is claimed is:

1. A coil construction for an electric motor comprising a stator having a plurality of alternating slots and teeth surrounding a central rotor accommodating opening, a rotor mounted for rotation within said stator opening, and a plurality of windings disposed within a plurality of said stator slots and providing a plurality of phases, wherein the improvements resides in that said windings are incorporated in three independently wound coil series with each coil series containing coils for all of said phases, and each of said coil series occupying six adjacent stator slots with no two coil series occupying the same slot.

2. A coil construction for an electric motor according to claim 1, wherein each of said coil series comprises three coils, one coil for each of three phases, and each of said coils occupies two of said slots which are separated by two intervening slots.

3. A coil construction for an electric motor comprising a stator having a plurality of alternating slots and teeth surrounding a central rotor accommodating opening, a rotor mounted for rotation within said stator opening, and a plurality of windings disposed within a plurality of said stator slots and providing a plurality of phases, wherein the improvement resides in that said windings are incorporated in at least two independently wound coil series with each coil series containing three coils, one coil for each of three phases, each of said coil series occupying six adjacent stator slots with no two coil series occupying the same slot, and each of said coils occupies two of said slots which are separated by two intervening slots.

* * * * *